United States Patent Office 3,154,595
Patented Oct. 27, 1964

3,154,595
OLEFIN POLYMERIZATION CATALYZED BY AMINATED ALKALI METAL
George R. Donaldson, Barrington, Ernest L. Pollitzer, Hinsdale, and Richard S. Corey, Rolling Meadows, Ill., assignors to Universal Oil Products Company, Des Plaines, Ill., a corporation of Delaware
No Drawing. Filed Sept. 29, 1960, Ser. No. 59,165
6 Claims. (Cl. 260—683.15)

This invention relates to a method for the conversion of organic compounds and particularly to a method for the conversion of olefinic hydrocarbons. More particularly yet the invention is concerned with a process for dimerizing an olefinic hydrocarbon in the presence of certain catalytic compositions of matter.

The need for crude rubber, either natural or synthetic has increased at a tremendous rate inasmuch as rubber has attained a position of great importance as a material of modern manufacture, said importance being due to the diverse uses to which it may be put. Heretofore in past years the amount of rubber which may be obtained naturally from rubber trees has been sufficient to satisfy the requirements of modern living. However, the sources of natural rubber may be made unattainable to many countries due to emergencies which may arise. This condition was made apparent during the last war when many sources of natural rubber in the Far East, such as Southeast Asia, were cut off from the Western Hemisphere. When situations such as this arise, substitutes must be found to take the place of the missing natural rubber. Heretofore, synthetic rubbers such as the types produced by the reaction of butadiene and styrene (GR-S), butadiene and acrylonitrile (Buna-M), butadiene and isobutylene, Thiokol rubber, silicone rubber, Neoprene rubber, etc., have been prepared. However, these products have usually been inferior to natural rubber in many of the necessary properties when in the vulcanized, elastic state.

It has now been discovered that a diolefinic hydrocarbon such as isoprene may be caused to polymerize stereoselectively to a rubbery product similar in many respects to the natural Hevea type rubber. The uses of such a rubber in articles of manufacture are many and varied, being too numerous to list in their entirety. A few representive uses are, for example, raw rubber which may be used in the shoe industry for the production of crepe soles for shoes, for erasers, adhesive cements and in the fabrication of gummed fabrics such as, for example, rubber cloaks; vulcanized rubber products which will include bumpers, buffers, vehicle tires, shock- and sound-proof articles, rubber bands, stoppers, stamps, sponges, elastic thread, belts, packing materials for machine construction, installation, etc.; and hard rubber which may be used as a suitable material for combs, tubing, fountain pens, dental goods, etc.

Therefore, as hereinbefore set forth, the need for a diolefinic hydrocarbon such as isoprene is greatly magnified, said compound assuming a greater importance than heretofore known for the production of such a rubber as the hereinbefore mentioned Hevea type.

It has now been discovered that unsaturated organic compounds such as olefinic hydrocarbons and, particularly, propylene may be selectively converted in the presence of certain catalysts hereinafter set forth to form a dimer of propylene, namely, 2-methyl-2-pentene, which is an intermediate in the preparation of isoprene, the final product being obtained by the demethanation of the propylene dimer.

It is therefore an object of this invention to provide a process for the conversion of organic compounds using a novel catalyst therefor.

Another object of this invention is to provide a process utilizing certain catalytic compositions of matter which will selectively convert olefinic hydrocarbons to preferred polymers thereof.

A specific object of this invention is to provide a novel method for selectively polymerizing certain olefinic hydrocarbons to provide a desired dimer of the olefinic hydrocarbon and for pretreating the catalyst whereby the efficiency of said catalyst is maintained at a high degree.

One embodiment of this invention is found in a process for the conversion of an unsaturated organic compound which comprises treating said compound in a reaction zone at conversion conditions in the presence of an aminated alkali metal disposed on a promoted solid metal oxide support, the improvement in said process comprising the pretreatment of said catalyst with a liquid solvent prior to the introduction of said compound into said reaction zone.

Another embodiment of the invention is found in a process for the conversion of an olefinc hydrocarbon which comprises treating said hydrocarbon in a reaction zone at a temperature in the range of from about 50° to about 250° C. and at a pressure in the range of from about 5 to about 250 atmospheres in the presence of a catalyst consisting of an aminated alkali metal disposed on a promoted solid support, the improvement in said process comprising the pretreatment of said catalyst with a substantially inert organic solvent prior to the introduction of said hydrocarbon into said reaction zone.

A further embodiment of the invention is found in a process for the conversion of an olefinic hydrocarbon which comprises treating said hydrocarbon in a reaction zone at a temperature in the range of from about 50° to about 250° C. and at a pressure in the range of from about 5 to about 250 atmospheres in the presence of a catalyst consisting of an aminated alkali metal disposed on a promoted gamma-alumina support, the improvement in said method comprising the pretreatment of said catalyst with n-pentane prior to the introduction of said hydrocarbon into said reaction zone.

A specific embodiment of the invention resides in a process for the conversion of propylene which comprises treating said propylene in a reaction zone at a temperature in the range of from about 50° to about 250° C. and at a pressure in the range of from about 5 to about 250 atmospheres in the presence of a catalyst consisting of aminated potassium disposed on a lithiated gamma-alumina support, the improvement in said process comprising the pretreatment of said catalyst with n-pentane prior to the introduction of said propylene into said reaction zone.

Other objects and embodiments referring to alternative aminated alkali metals, promoted metal oxide supports, unsaturated organic compounds and organic solvents will be found in the following further detailed description of the invention.

Unsaturated organic compounds and particularly olefinic hydrocarbons which may be converted (the terms "converted" and "conversion" as used herein in the specification will be defined as, but not limited to, "polymerized" and "polymerization," and may also include alkylation) by treating in the presence of a novel catalyst of the type hereinafter more fully described include monoolefins such as ethylene, propylene, 1-butene, 2-butene, 1-pentene, 2-pentene, 1-hexene, 2-hexene, 3-hexene, 1-heptene, 2-heptene, etc., polyolefins such as 1,3-butadiene, 1,3-pentadiene, 2-methyl-1,3-butadiene (isoprene), 1,4-pentadiene, 1,3-hexadiene, 1,4-hexadiene, etc.; cyclic olefins such as cyclopentene, cyclohexene, cycloheptene, etc. In addition it is also contemplated within the scope of this invention that besides the aforementioned olefins which may be condensed by themselves, other olefins of the types hereinbefore listed may be condensed with a dissimilar olefin although not necessarily with equivalent results. In addition to the condensation of the aforementioned olefins the catalyst composition hereinafter described may be used as a catalyst for the side chain alkylation of alkaryl compounds, and particularly alkyl aromatic hydrocarbons which contain at least one replaceable hydrogen atom on the α-carbon atom in the side chain, such compounds including toluene, o-xylene, m-xylene, p-xylene, ethylbenzene, propylbenzene, isopropylbenzene, butylbenzene, the diethyl benzenes, the dipropyl benzenes, etc., the afore mentioned olefinic hydrocarbons, or compounds capable of forming olefinic hydrocarbons under the conditions at which the reaction proceeds being used as the alkylation agents. Furthermore the catalyst composition will act as an isomerization catalyst, shifting the double bond of unsaturated hydrocarbons, such as butene-1 or a propylene dimer (2-methyl-1-pentene), to a more centralized position in the chain without involving further polymerization of the olefin, said isomerization involving only the shift of the double bond without carbon skeleton rearrangement.

As hereinbefore set forth the conversion process of the present invention is effected in the presence of an aminated alkali metal disposed on a promoted metal oxide support. The term "promoted" as used hereinbefore and hereinafter in the specification and appended claims will refer to a pretreatment of the metal oxide support with a salt or hydroxide of a metal selected from the group including the alkali metals and alkaline earth metals such as lithium, sodium, potassium, rubidium, cesium, magnesium, calcium, strontium and barium. Furthermore, the term "aminated alkali metal" will refer to both alkali metals which have been subjected to amination by any means known in the art subsequent to impregnation on the metal oxide support and also to alkali metal amides. Of the alkali metals which are aminated, potassium and sodium are preferred, inasmuch as said metals exhibit substantially more activity than do other metals of the alkinous metal group (i.e. the group comprising alkali metals and alkaline earth metals) and potassium is especially preferred for the same aforesaid reason. In addition to the high activity these two metals are preferred from an economic standpoint inasmuch as said metals are relatively more plentiful and correspondingly less expensive to use. The alkali metals are disposed on a support in a quantity ranging from about 2 to about 20% or more by weight based on the support. However, not every solid support can utilized as a satisfactory one for disposal of an alkali metal thereon. As is well known to one experienced in the art, the alkali metals react relatively violently with water and thus care must be taken to utilize those supports which are relatively or substantially free from water. In most cases, this freedom from water of the support is achieved by a precalcination treatment of said support. This precalcination is carried out at a relatively high temperature in the range of from about 400° to about 700° C. and for a time sufficient to effect substantial removal of adsorbed or combined water from the support. The time required will vary depending upon the support, and in addition depending upon whether the water is in a combined or in merely a physically adsorbed form. In addition to the necessity for freedom from water, the support is characterized by the necessity for having a high surface area. By the term high surface area is meant a surface area measured by surface adsorption techniques within the range of from about 25 to about 500 or more square meters per gram and preferably a support having a surface area of approximately 100 to 300 square meters per gram. For example, it has been found that certain low surface area supports such as alpha-alumina which is obviously free from combined water and which has been freed from adsorbed water is not a satisfactory support for the alkali metals in the preparation of catalysts for use in the process of this invention. Alpha-alumina is usually characterized by a surface area ranging from about 10 to about 25 square meters per gram. In contrast, gamma-alumina which has a surface area ranging from about 100 to about 300 square meters per gram, and which has been freed from adsorbed water and which contains little combined water, is a satisfactory support. Celite, a naturally occurring mineral, after precalcination, is not a satisfactory support. Celite has a surface area of from about 2 to about 10 square meters per gram. Likewise alkali metal dispersions on sand or on other low surface area silica are not sasitfactory catalysts in this process. In addition, aluminas which contain combined water but which have relatively high surface areas are also not satisfactory supports. Such aluminas include dried alumina mono-hydrates which have not been sufficiently calcined to remove combined water and to form gamma-alumina. These alumina hydrates may have surface areas ranging from about 50 to about 200 square meters per gram but because they contain combined water are not satisfactory supports. Particularly preferred supports for the preparation of catalysts for use in the process of this invention include high surface area crystalline alumina modifications such as gamma-, eta- and theta-alumina, although these are not necessarily of equivalent suitability. However, as is obvious from the above discussion the limitation on the use of any particular support is one of freedom from combined or adsorbed water in combination with the surface area of the support selected. In addition to the aforementioned types of support another type is that which is prepared from an alkali aluminate such as sodium aluminate, potassium aluminate, etc., from which a substantial majority of the alkali metal has been removed leaving only the aluminate with a relatively minor amount of the alkali metal present.

The desired support, preferably, although not necessarily, gamma-, eta- or theta-alumina may be pretreated with a promoter in any manner. The preferred method for promoting the support is to contact or impregnate the support with either the salt or hydroxide of the alkali metal or an alkaline earth metal. A particularly effective salt which may be utilized comprises the nitrates of an alkali metal or alkaline earth metal such as sodium nitrate, potassium nitrate, lithium nitrate, cesium nitrate, barium nitrate, calcium nitrate, strontium nitrate, etc. Other salts of alkali or alkaline earth metals which will decompose at temperatures below about 750° C. may also be utilized, although not necessarily with equivalent results. An alternative method of impregnating the solid support is to treat said support with an alkali metal hydroxide such as lithium hydroxide, potassium hydroxide, sodium hydroxide, etc. If the support is impregnated with a salt of an alkali or alkaline earth metal the promoted support is then calcined at a temperature in the range of from about 500° to about 750° C. whereby the salt of the alkali or alkaline earth metal is probably decomposed to the oxide.

The promoted metal oxide support is then further treated with an alkali metal in one method of preparing the desired catalyst of the present invention. It has now been discovered that merely impregnating the solid support with the alkali metal, even with vigorous stirring of the support and the metal, results in a relatively poor distribution of the alkali metal on the metal oxide support. This will result in a catalyst which possesses a low activity as concerns the ability to convert the hydrocarbons to the desired product, even after subsequent amination of the catalyst. The catalytic activity of the catalyst depends not only upon the percentage of alkali metal distributed on the surface of the metal oxide support but also on the uniformity of distribution of said metal, and it has been established that once the alkali metal has been distributed on the support, it cannot be redistributed by heating the support and metal above the melting point and subjecting the molten catalyst to further stirring.

It has now been discovered that catalysts which possess a relative high hydrocarbon conversion activity and especially the ability to polymerize unsaturated organic compounds such as olefins and diolefins, and also to promote the isomerization of olefinic hydrocarbons, may be prepared by depositing or impregnating the metal on the promoted metal oxide support out of a liquid ammonia solution. When the metal is deposited on the promoted metal oxide support which is immersed in a liquid ammonia solution at a temperature approximately that of the reflux temperature of ammonia, $-33°$ C., accompanied with vigorous stirring or rotation, the solution is in effect a molecular dispersion and the metal which is deposited on the promoted metal oxide support is in an extremely uniform and finely divided state, thereby yielding catalysts which possess a relatively high activity and corresponding ability to convert hydrocarbons subjected to treatment in the presence of such a catalyst to the desired conversion products, one example of this being the dimerization of propylene to form 2-methyl-2-pentene. It is also contemplated within the scope of this invention that a catalyst may be prepared by forming a promoted metal oxide support in the usual manner hereinbefore set forth and impregnating said support, immersed in liquid ammonia, with an alkali metal amide whereby a more uniform distribution of the alkali metal amide over the surface of the promoted metal oxide support is achieved, thus forming a catalyst which possesses a higher degree of hydrocarbon conversion activity. As hereinbefore set forth, the promoted metal oxide support may be treated with an alkali metal such as potassium, sodium, lithium, cesium, or rubidium or the alkali metal amide such as potassium amide, sodium amide, lithium amide, cesium amide and rubidium amide. The liquid ammonia is allowed to evaporate leaving the desired aminated alkali metal impregnated on the promoted metal oxide support. As hereinbefore set forth the liquid ammonia solution of either the aforesaid metal or metal amide may be employed either at or below the atmospheric boiling point of liquid ammonia, namely $-33°$ C., or at higher temperatures and correspondingly higher pressures sufficient to maintain the ammonia in liquid phase. For example, the impregnation may be conducted in pressure autoclaves at room temperature, i.e., $20°$ to $30°$ C.

It has now been discovered that the presence of any ammonia remaining from the preparation of the catalyst is detrimental to the process and affects the conversion of the olefin by poisoning the catalyst to a point where the percentage of hydrocarbon conversion drops and finally reaches zero. This is due to the fact that an alkali metal amide such as potassium amide often crystallizes with what might be termed "ammonia of crystallization" to form the compound $MNH_2 \cdot xNH_3$ where $x$ equals 2-4. A specific example of this would be the crystallization of potassium amide with ammonia to form $KNH_2 \cdot xNH_3$. However, it has now been discovered that if the catalyst is pretreated with certain substantially inert organic solvents whereby the excess ammonia is swept out of the reaction zone and off of the catalyst before the unsaturated organic compound and particularly an olefinic hydrocarbon is charged to said zone, the catalyst will retain its initial activity for a relatively longer period of time and will not become poisoned, the aforesaid poisoning of the catalyst resulting in the reduction of the efficiency of the catalyst to a point whereby the conversion of the olefinic hydrocarbon is no longer economically feasible. This requirement of sweeping out the catalyst to remove all free or excess ammonia present will be graphically illustrated in the examples found at the end of this specification. The substantially inert organic solvents or diluents which may be used to sweep out the excess ammonia from the catalyst and the reaction zone before introduction of the olefinic charge include paraffinic hydrocarbons such as n-pentane, n-hexane, n-heptane, isoheptane, octane, nonane, and aromatic hydrocarbons such as benzene, toluene, o-xylene, m-xylene, p-xylene, etc. This pretreatment is preferably carried out at elevated temperatures in the range of from about $100°$ to about $150°$ C., although lower or higher temperatures may also be employed. The pretreatment with the sorbent usually will take from about 2 to about 55 hours or more. It is to be understood that the substantially inert organic solvents are only representatives of the class of compounds which may be used, and that the present invention is not necessarily limited thereto.

The process of this invention may be effected in any suitable manner and may comprise either a batch or a continuous type operation. For example, when a batch type operation is used the desired catalyst comprising an aminated alkali metal disposed on a promoted metal oxide support, a specific example of which comprises aminated potassium disposed on a lithiated gamma-alumina support is placed in an appropriate apparatus such as a condensation flask or, if higher temperatures and pressures are to be used, in a rotating autoclave. The apparatus is then flushed with a solvent, specific examples of which include n-pentane, n-hexane, etc., until all free and excess ammonia has been driven off of the catalyst and out of the reaction zone. Following this the unsaturated organic compound such as an olefinic hydrocarbon is charged to the reaction zone following which the apparatus and contents thereof are heated to the desired reaction temperature and pressure and maintained thereat for a predetermined period of time. If higher than self-generated pressures are to be used an inert gas such as nitrogen may be pressed in until the desired pressure has been reached. At the end of the desired residence time the apparatus and contents thereof are cooled to room temperature, the excess pressure is vented and the reaction product is recovered and separated by conventional means such as fractional distillation, crystallization, etc.

The process of this invention may also be effected in a continuous type operation, the catalyst comprising an aminated alkali metal disposed on a promoted metal oxide support being particularly suitable for use in a fixed bed type of operation. When this method is used the catalyst is disposed as a fixed bed in a reaction zone. Following this the reaction zone is thoroughly flushed with an inert organic solvent such as n-pentane, n-hexane, etc., for a period of time ranging from about 1 hour to about 50 hours or more until all free and excess ammonia has been removed from the catalyst and the reaction system. The reaction zone which may comprise an unpacked vessel or coil or which may be lined with a suitable packing material such as fire brick, dehydrated bauxite, alumina and the like is maintained at the proper operating conditions of temperature and pressure while the olefinic hydrocarbon is continuously charged thereto. In carrying out the process of this invention in a continuous manner liquid hourly space velocities (the volume of liquid hydrocarbon charged to the reactor per volume of catalyst per unit of time) may be varied within a relatively wide range of from about 0.1 to about 20 or more, the preferred range being from about 0.1 to about 10. The desired reaction product is continuously withdrawn from the reaction zone, separated from the reactor effluent and purified by conventional means while said remaining effluent may be recharged at least in part to the reaction zone as a portion of the feed material. If so desired, the olefinic hydrocarbon may be admixed with an organic solvent, either the same solvent used to purify the system of nitrogen such as pentane or a dissimilar solvent such as hexane prior to entry into said reactor and the hydrocarbon-solvent system may then be charged thereto in a single stream.

Other continuous types of operations which may be used in this process include the compact moving bed type of operation in which the bed of catalyst and the reactants pass either concurrently or countercurrently to each other in the reaction zone, and the slurry type operation in which the catalyst is carried into the reaction zone as a slurry in one of the reactants.

The hydrocarbon conversion process, an example of which comprises polymerization, hereinbefore illustrated and utilizing the catalysts of this invention is preferably effected at elevated temperatures and pressures, the temperature being in the range of from about 50° to about 250° C. or more. Generally speaking the pressure at which this process operates will be dependent upon the particular organic compounds undergoing conversion and the particular catalyst which is used in the process, said pressure being sufficient to maintain a substantial portion of the hydrocarbons in the liquid phase, said pressure being in the range of from about 5 to about 250 atmospheres or more (73 to 2840 p.s.i.g.).

The following examples are given to illustrate the process of the present invention which, however, are not intended to limit the generally broad scope of the present invention in strict accordance therewith.

EXAMPLE I

A catalyst was prepared by treating fluoride-free gamma-alumina spheres, which had been calcined for four hours at 550° C. prior to use, with lithium hydroxide solution in an amount sufficient so that 0.5 weight percent of lithium as lithium hydroxide was deposited on the gamma-alumina base. The promoted alumina was then calcined at a temperature of about 550° C. for an additional two hours.

Following this, 350 cc. of ammonia was condensed in a flask along with 0.2 g. of calcined ferric oxide as a promoter. The flask was maintained at the reflux temperature of ammonia (−33° C.) and approximately 12.5 g. of potassium was slowly added to the flask in small increments. When the potassium was dissolved the mixture was stirred until the blue color resulting from the addition of the potassium disappeared, thereby indicating that the reaction of potassium and ammonia to form potassium amide had gone to completion. Following this, the promoted alumina was slowly added, the mixture being continuously stirred and the ammonia was allowed to evaporate. The final catalyst contained approximately 20% by weight of potassium amide calculated as potassium on the lithiated gamma-alumina base.

The catalyst was placed in a reactor tube which comprises a ⅞″ inner diameter stainless steel tube. One-hundred cc. of the catalyst was loaded into the reactor under anhydrous conditions using high surface sodium dried nitrogen as a blanketing gas. The pentane charge was pumped through a high surface sodium containing drier operated at a temperature of about 200° C. while the propylene charge was passed through a similar vessel operated at room temperature. In addition the third charge system comprising ammonia was predried over a hot, high surface sodium at about 200° C. The reactor effluent was charged directly to a debutanizer column and the debutanizer product was collected in a receiver maintained at wet ice temperature. The debutanizer overhead gas was sampled and metered in the conventional manner. In this example the ammonia content of the debutanizer overhead gas was determined periodically by the use of sulfuric acid-acetone traps maintained at Dry Ice temperature, the scrubber solution being prepared by dissolving 1 cc. of concentrated sulfuric acid and 50 cc. of acetone.

To show the effect of ammonia being present in the reaction zone whereby the efficiency of the catalyst was impaired the charge stock in this example comprised propylene, normal pentane and ammonia. The results of this experiment are set forth in Table I below.

Table I

| Period No. | 1 | 2 |
|---|---|---|
| Hours on Stream | 0–10 | 10–18 |
| Operating Conditions: | | |
| Pressure, p.s.i.g. | 1,800 | 1,800 |
| Temperatures, ° C.: | | |
| Block Furnace | 121 | 121 |
| Catalyst | | |
| Inlet | 121 | 121 |
| Maximum Temperature | 123 | 121 |
| Outlet | 121 | 121 |
| LHSV, Propylene Charge | 0.85 | 0.85 |
| Total Charge | 2.0 | 2.0 |
| Rates: | | |
| Propylene Charge, g./hr | 39.6 | 40.1 |
| nC$_5$+1,031 p.p.m. NH$_3$ | 18.1 | 18.5 |
| n-Pentane Charge, g./hr | 49.3 | 52.0 |
| Yields (Indicated): | | |
| Net C$_6$+ g./hr | 39.8 | −1.3 |
| Propylene Conversion by Gas Rate, Weight Percent C$_3$=Charged | 6.4 | 0 |

It is readily apparent that the addition of ammonia to the charge stock resulted in an eventual total lack of conversion of propylene to the dimer thereof.

EXAMPLE II

In this example a hydrocarbon conversion catalyst was prepared in a manner similar to that set forth above. Fluoride-free gamma-alumina spheres which had been calcined at 550° C. for four hours prior to use were impregnated with a lithium hydroxide solution in an amount sufficient so that 0.5 weight percent of lithium based on the support was present on the lithiated gamma-alumina. Ammonia was condensed in a flask and maintained at the reflux temperature of ammonia while potassium was slowly added thereto in small increments. After the potassium had dissolved and the stirred mixture had lost the blue color which developed upon addition of the potassium, the lithiated alumina was added thereto accompanied by vigorous stirring. Upon completion of the addition of the lithiated gamma-alumina support the ammonia was allowed to evaporate, the final catalyst composition containing approximately 10% by weight of potassium (as KNH$_2$) based on the lithiated gamma-alumina support. This catalyst was divided into two portions and used as a hydrocarbon conversion catalyst in an apparatus similar to that set forth in Example I above. In the first reactor the reaction zone after being charged with the catalyst, was subjected to a n-pentane flush pretreatment at a temperature of about 135° C. for a period of about one hour, following which a charge comprising propylene and n-pentane in a 1:1 mole ratio was charged to the reactor, the run being designated at Run No. 1. In the second reaction zone the catalyst was loaded and subjected to a pentane flush pretreatment of about 54 hours at a temperature in the range of from about 120° to about 140° C. before the charge of propylene and n-pentane was added thereto, this run being designated as Run No. 2. The results of these tests are set forth in Table II below.

Table II

| Run No. | 1 | 2 |
|---|---|---|
| Total LHSV | 4 | 4 |
| Propylene LHSV | 1.7 | 1.7 |
| Pentane LHSV | 2.3 | 2.3 |
| C$_5$:C$_3$=Mole Ratio | 1:1 | 1:1 |
| Block Temperature, ° C. | 135 | 135 |
| Maximum Catalyst Temperature, ° C. | 142 | 150 |
| Propylene Conversion, Percent | 21 | 31 |

It is readily apparent from the above table that the catalysts which had been subjected to a pentane flush treatment for a period of time in excess of one hour exhibited a superior conversion activity over that catalyst which was pretreated with pentane for a relatively short period of time, and, when compared to a run as shown in Table I in Example I wherein the catalyst was subject to an ammonia flow along with the pentane flow and propylene flow, also exhibited a superior conversion activity. These runs therefore graphically illustrate the necessity of flushing all traces of ammonia which may be present from the reaction zone and the catalyst prior to introduction of the hydrocarbon charge which is to undergo conversion therein and that failure to do so will result in a drastic loss of conversion activity of the animated alkali metal disposed on an alkalized metal oxide support catalyst.

EXAMPLE III

To further illustrate the effect of alkyl amines which may also poison the catalyst another catalyst was prepared in a manner similar to that set forth in Example I above, the final catalyst containing 20% by weight of potassium amide calculated as potassium on a lithiated gamma-alumina support containing 0.5 weight percent of lithium hydroxide calculated as lithium on the base. The reaction zone was similar to that used in the above examples, that is, a stainless steel tube of 7/8" inner diameter was loaded with 100 cc. of catalyst. The propylene-pentane mixture was charged to the reactor under operating conditions hereinafter set forth. After a certain period of time had elapsed the charge was altered by adding 100 parts per million of ammonia as isopropylamine, the addition being based on the total feed. As is noted in the following table the propylene conversion was radically reduced by the addition of this isopropyl benzene, the efficiency of the catalyst being greatly effected by this addition.

Table III

| Run No | 1 | 2 | 3 | 4 | 5 |
|---|---|---|---|---|---|
| Operating Conditions: | | | | | |
| Pressure, p.s.i.g | 1,000 | 1,000 | 1,000 | 1,000 | 1,000 |
| Temperature, °C.: | | | | | |
| Block Furnace | 120 | 135 | 135 | 120 | 120 |
| Catalyst | | | | | |
| Inlet | 120 | 137 | 138 | 121 | 120 |
| Maximum Temperature | 128 | 151 | 150 | 127 | 122 |
| Outlet | 124 | 141 | 140.5 | 122 | 121 |
| LHSV, Propylene | | | | | |
| Charge | 0.85 | 0.85 | 0.85 | 0.85 | 0.85 |
| Total Charge | 2.0 | 2.0 | 2.0 | 2.0 | 2.0 |
| Rates: | | | | | |
| Propylene Charge, g./hr. | 42.6 | 44.4 | 43.6 | 46.0 | 47.2 |
| n-Pentane Charge, g./hr. | 74.4 | 75.4 | 74.2 | 69.2 | 73.2 |
| n-Pentane+amine, g./hr. | | | | 18.4 | 20.2 |
| Yields (Indicated): Propylene Conversion by Gas Rate, Weight Percent Propylene Charged | 52 | 59 | 60 | 22.8 | 8.0 |

We claim as our invention:

1. In the polymerization of an olefinic hydrocarbon in contact with a catalytic composite of an aminated alkali metal and a substantially anhydrous, high surface area support containing ammonia as a result of its method of preparation, the improvement which comprises flushing said composite, prior to contacting said hydrocarbon therewith, with a liquid organic solvent selected from the group consisting of paraffinic and aromatic hydrocarbons at a temperature and for a time sufficient to remove all of the free and excess ammonia from the composite.

2. In the polymerization of an olefinic hydrocarbon in contact with a catalytic composite of a substantially anhydrous, high surface area alumina and an aminated alkali metal containing ammonia as a result of its method of preparation, the improvement which comprises flushing said composite, prior to contacting said hydrocarbon therewith, with a liquid organic solvent selected from the group consisting of paraffinic and aromatic hydrocarbons at a temperature and for a time sufficient to remove all of the free and excess ammonia from the catalytic composite.

3. In the polymerization of an olefinic hydrocarbon in contact with a catalytic composite of gamma-alumina and an aminated alkali metal containing ammonia as a result of its method of preparation, the improvement which comprises flushing said composite, prior to contacting said hydrocarbon therewith, with a liquid organic solvent selected from the group consisting of paraffinic and aromatic hydrocarbons at a temperature of from about 100° to about 150° C. and for a time period of from about 2 to about 55 hours until all of the free and excess ammonia has been driven from the catalytic composite.

4. The improvement of claim 3 further characterized in that said solvent comprises n-pentane.

5. The improvement of claim 3 further characterized in that said solvent comprises n-hexane.

6. The improvement of claim 3 further characterized in that said solvent comprises n-heptane.

References Cited in the file of this patent

UNITED STATES PATENTS

| | | |
|---|---|---|
| 1,713,236 | Midgley et al. | May 14, 1929 |
| 2,849,432 | Kibler et al. | Aug. 26, 1958 |
| 2,881,234 | Esmay et al. | Apr. 7, 1959 |